Sept. 9, 1952   E. KOLISCH   2,610,283
ELECTRIC PERCOLATOR
Filed Sept. 28, 1949   3 Sheets-Sheet 1
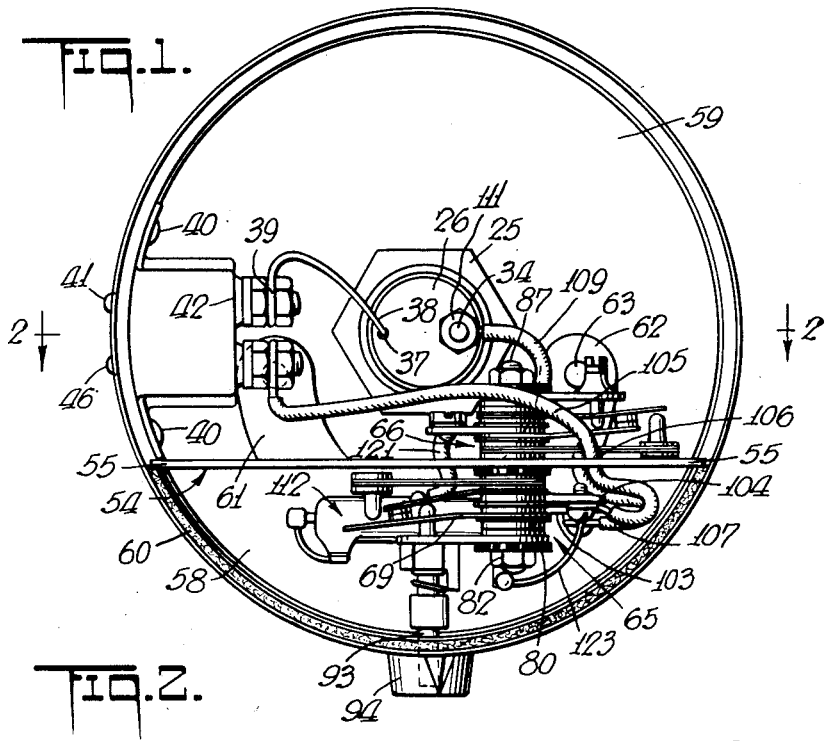
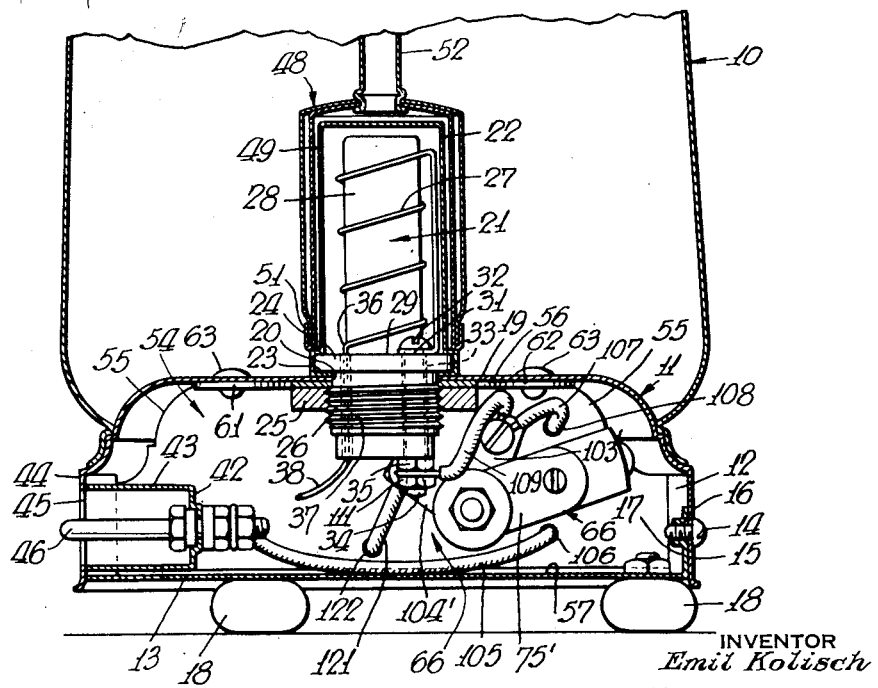
INVENTOR
*Emil Kolisch*
BY
*Dean Fairbanks & Hirsch*
ATTORNEYS Sept. 9, 1952   E. KOLISCH   2,610,283
ELECTRIC PERCOLATOR
Filed Sept. 28, 1949   3 Sheets-Sheet 2
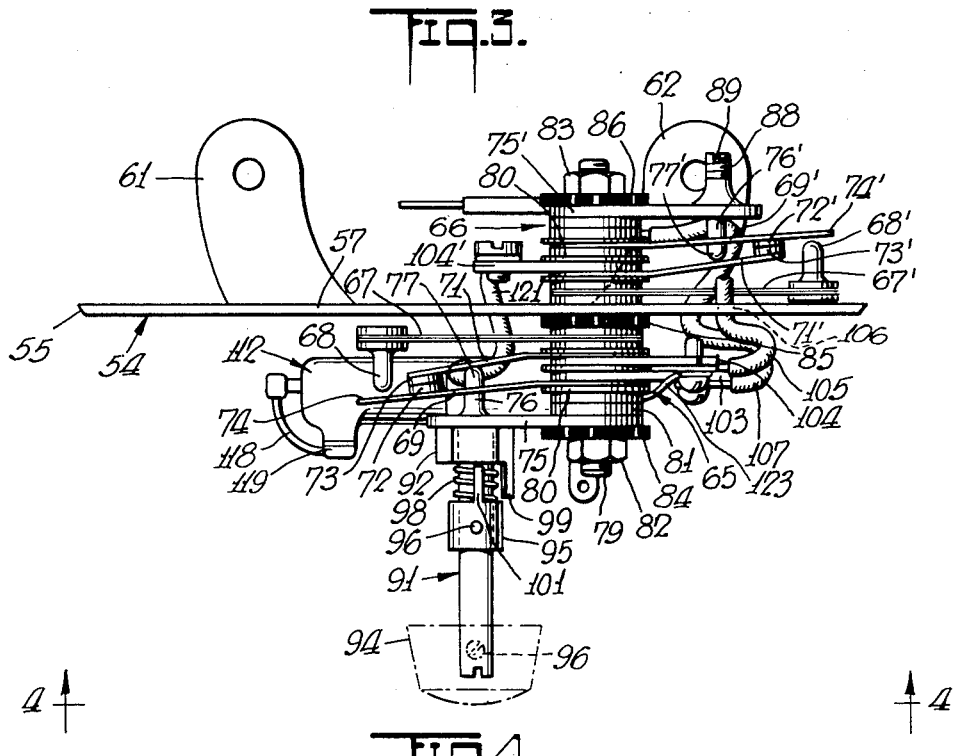
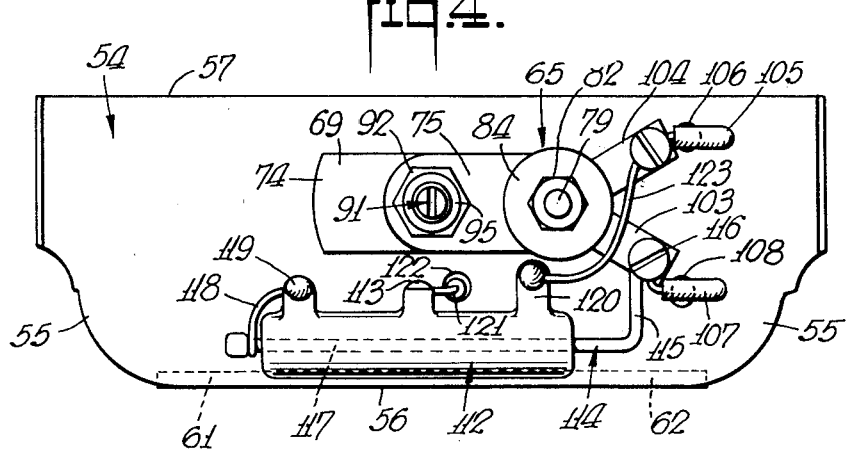
INVENTOR
*Emil Kolisch*
BY
*Dean Fairbank & Hirsch*
ATTORNEYS

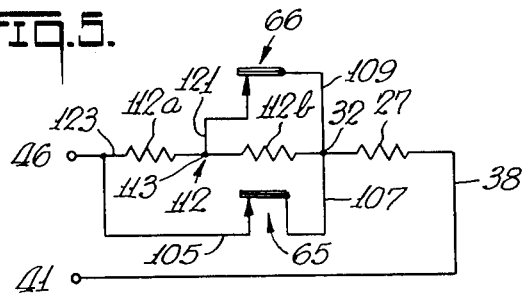
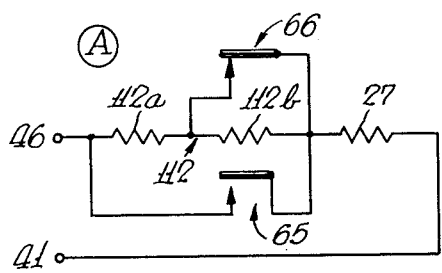
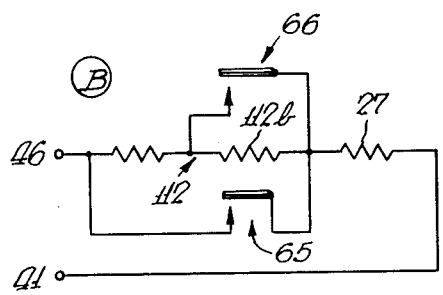
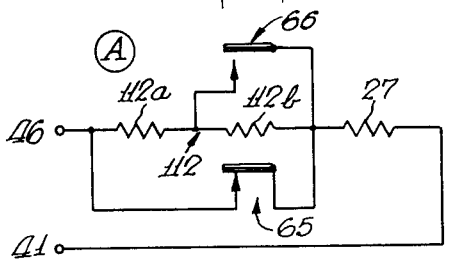
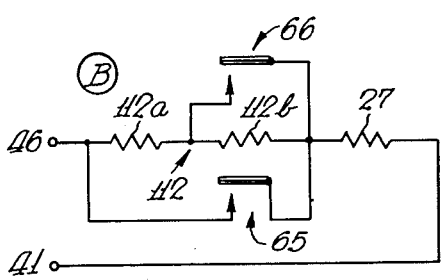
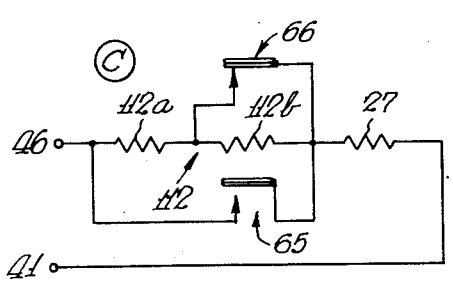
INVENTOR
*Emil Kolisch*
BY
*Dean Fairbank & Hirsch*
ATTORNEYS Patented Sept. 9, 1952

2,610,283

UNITED STATES PATENT OFFICE 2,610,283

ELECTRIC PERCOLATOR

Emil Kolisch, New York, N. Y., assignor to Continental Silver Co., Inc., a corporation of New York Application September 28, 1949, Serial No. 118,354

3 Claims. (Cl. 219—44)

This invention relates to electric percolators, more particularly of the type having automatic temperature control facilities including a thermostat for cutting off percolation and thus determining the strength of the coffee diffusion.

As conducive to a clear understanding of the invention, it is noted that if the thermostat should reach its cut-off temperature before the coffee diffusion has attained the predetermined temperature corresponding to the strength of coffee desired, the resulting diffusion would be too weak, and on the other hand if the thermostat should not reach its cut-off temperature until after the coffee diffusion had attained such predetermined temperature, percolation would continue too long and the resultant diffusion would be too strong.

The rate of temperature rise of the thermostat of an electric percolator due to radiation and convection from the heating element may vary substantially in mass production from percolator to percolator because of the wide tolerance usually permitted in the rating of such heating element and also due to the tolerance in the distance between the thermostat and the heating element within the percolator, so that correspondingly wide divergencies result from unit to unit of any one model of percolator in the desired strength and temperature of the beverage, unless costly and time-consuming special adjustment and regulation of each individual percolator is resorted to at the factory in the attempt to compensate for such divergencies.

It is accordingly among the objects of the invention to provide an electric percolator of simple, relatively inexpensive, compact and rugged construction, utilizing but few parts, substantially all of which are conventional, in which the thermostat, though not exposed to contact with the liquid will yet under all conditions of operation and without the need for regulation of the percolator, reliably cut off percolation when the coffee diffusion reaches substantially the selected percolation cut-off that corresponds to the strength of coffee desired, substantially unaffected by tolerances in the heat output of the heating element, or by variations incurred in assembly in the relative position of the heating element and the thermostat.

According to the invention, the percolator includes a control chamber in substantially non-heat transfer relation to the electric heating element but having a relatively large heat radiating surface in heat conductive relation to the liquid in the receptacle, and the thermostat confined in said chamber is mounted in heat insulating relation with respect to the electric heating element, so that said thermostat is subjected substantially only to the heating effect imparted thereto by radiation and convection of the air in the chamber which is heated substantially only from the liquid in the receptacle which is in contact with said heat radiating surface.

If an electric percolator is subject to unusual external temperature influences, as for instance by exposure to draft in a cold environment or by exposure to excessive heat, as for instance, in proximity to a hot stove, the operation of the thermostat therein may be seriously disturbed so that on the one hand cut-off will be greatly retarded or prevented entirely, or, on the other hand, will occur prematurely.

If an electric percolator were used at all times only under normal external conditions, such extraneous variations could be disregarded, but this might involve the need for precaution in use, and it is accordingly another object to guard against the effect of unusual temperature and movement of the external air, which might unduly disturb the operation of the thermostat and thereby to avoid in all cases premature cut-off on the one hand before the desired strength of coffee has been attained, or on the other hand, continuation of percolation long after the coffee has reached such desired strength.

It is accordingly another feature of the invention to reduce so far as practical, the transfer of heat by radiation between the control chamber and the external air, a result attained for practical purposes by lining the externally exposed surface of the control chamber with insulation such as asbestos.

Another object is to provide an electric control sub-assembly for installation in a coffee percolator, which sub-assembly may readily be preset so that when installed in any percolator of given construction it will operate in substantially the same temperature range, regardless of tolerances in the output of the heating element thereof, of variations in the positioning of the sub-assembly, or of fluctuations in the temperature or movement of the external air.

In an electric percolator equipped with a thermostat set to cut off percolation after the relatively short period of time required to produce a relatively mild coffee diffusion of much less than maximum strength, the temperature of the diffusion would, in general, be below the drinking temperature preferred by most persons and if, on the other hand, the percolation is to stop only when the preferred drinking temperature has been attained, the diffusion would be stronger than desired.

It is accordingly another object to provide an electric percolator of the above type which, after operating initially as above set forth to effect percolation of the liquid until the diffusion of coffee has attained a predetermined temperature and strength, thereafter without the possibility of re-percolation, brings the diffusion of the desired strength to and maintains it at optimum drinking temperature that, depending on the strength of the coffee diffusion, may for strong coffee be below, or for mild or medium coffee be above the temperature at which percolation ceases.

According to another feature of the invention, an auxiliary thermostat controls the further application of heat to the coffee diffusion, once the previously referred to or main thermostat has opened and the percolation has ceased, said auxiliary thermostat maintaining the diffusion within the drinking temperature range that may be higher than the temperature at which percolation ceases for mild coffee or lower than the temperature at which percolation ceases for strong coffee, said auxiliary thermostat having an associated resistor which is the primary source of the post-percolation heating and which also serves to maintain the main thermostat open and thereby to preclude re-percolation.

In the embodiment herein chosen to illustrate the invention, a plate of heat conductive material is desirably positioned in the cavity of the base of the percolator and affixed to the floor of the receptacle, and extends across said cavity to form the control chamber, that part of the axial heating element which extends into the cavity being at the exterior of said chamber and spaced from said plate.

The main thermostat which is positioned in such control chamber is desirably mounted on said plate and thermally insulated therefrom and the resistor or auxiliary heating means which is also in said control chamber is positioned in close heat transfer relation to the main thermostat and to the floor of the receptacle. The resistor which is in series with the heating element is normally short circuited by the main thermostat and is cut into circuit when the main thermostat is actuated, thereby materially reducing the current, yet evolving sufficient heat both to maintain the main thermostat in open position and to assure that the desired drinking temperature is maintained.

In the accompanying drawings in which are shown one or more of various possible embodiments of the several features of the invention:

Fig. 1 is a bottom plan view of the percolator with the bottom plate removed,

Fig. 2 is a fragmentary transverse sectional view taken along line 2—2 of Fig. 1, Fig. 3 is a view similar to Fig. 1 on a larger scale showing the control sub-assembly alone, Fig. 4 is an elevational view of the control sub-assembly taken along line 4—4 of Fig. 3, Fig. 5 is a diagrammatic view of the control circuit and, Figs. 6 and 7 are diagrammatic views of the control circuit in various stages of operation.

Referring now to the drawings, there is shown a preferred embodiment of a coffee percolator incorporating the temperature control sub-assembly. The percolator desirably comprises a receptacle 10 affixed to a hollow base 11 defining a cavity 12 therein. Screws 14 which pass through the rim 15 of the base 11 and are threaded into openings 16 in the upturned lugs 17 desirably formed integral with the periphery of the bottom plate 13 serve to secure the latter in place. Conventional legs 18 affixed to the bottom plate space the percolator from the table.

Carried by the top 19 of the base 11, which desirably serves as the floor of the receptacle, and extending through an opening 20 therein, is a heating element which includes a generally cylindrical, preferably ceramic mount 21. A cylindrical protective housing 22 encompasses that portion of the mount which protrudes above top 19 and although it may be affixed to the latter in any suitable manner, illustratively has an inturned rim 23 extending under diametrically opposed laterally extending ears 24 integral with the mount 21. A nut 25 secured upon the threaded lower end 26 of the mount 21 which protrudes below top 19 into cavity 12, causes the ears 24 to be pressed against the inturned rim 23 of the housing 22, rigidly and securely to clamp the housing 22 and mount 21 to the base 11.

A resistance wire 27 is wound around the upper end 28 of the mount 21, which desirably is of reduced diameter forming an annular ledge 29. One end 31 of the wire 27 is desirably connected to the head of a bolt 32 which extends through a vertical bore 33 in ledge 29 and the lower portion of mount 21, with the lower end of bolt 32 protruding from the bottom of the mount as at 34, being secured in place by a nut 35.

The other end 36 of the resistance wire 27 passes through a vertical bore 37 in ledge 29 and the lower portion of mount 21 and extends from the bottom of the mount as at 38 and is connected as at 39 to a terminal plug 41. Plug 41 is rigidly affixed to and insulated from the end wall 42 of a socket 43 affixed to the side wall 44 of the base 11 as by rivets 40 over an opening 45 therein, as is the companion terminal plug 46.

A conventional water pump 48 is provided, desirably having a double wall well portion 49 with a small opening 51 therein and a tube 52 rising in said receptacle from said well 49 and mounting the conventional coffee basket (not shown).

The construction thus far described is not per se claimed herein as it is conventional.

According to the present invention a control chamber 58 is provided in the base 11 to house control equipment therein, and with as large a heat radiating surface as is practicably possible. The control chamber may be formed by positioning in cavity 12, a transverse partition or plate 54 of aluminum alloy or other good heat conductive metal which divides the cavity 12 into two chambers, i. e., the smaller segmental chamber 58 and a larger segmental chamber 59, the heating element 27 which is axial of top 19 extending at its lower end 26 wholly in said larger chamber. Plate 54 desirably has its lateral edges 55 shaped to correspond to the conformation of the inner lateral face of the wall of the base, so that when positioned in cavity 12 with the top edge 56 thereof, as shown in Fig. 2, flush against the underface of the top 19 and at right angles thereto, the edges 55 will be but slightly spaced from the inner face of the wall of the base and the plate will extend as a chord across the cavity 12. The width of the plate 54 is preferably such that the edge 57 thereof will be but slightly spaced from the plate 12.

By the spacing set forth the plate 54 is effectively heat insulated from the outer air and is subjected substantially solely to the heat of the percolator content.

Means are provided securely to affix the plate 54 in cavity 12 so as to provide for maximum heat transfer from the undersurface of top 19 to plate 54. Although plate 54 could be welded at its upper edge 56 to the adjacent top 19 of the base, in the embodiment herein shown, the plate 54 desirably has a pair of ears 61 and 62 preferably formed integrally with and extending laterally outward from said upper edge 56 into chamber 59 to lie flush against the undersurface of top 19, to which they are affixed preferably by rivets 63.

Chamber 58 is preferably insulated from variations in the temperature and movement of the external air by means of a thermal insulating shield 60 desirably of asbestos, positioned against the arcuate wall portion thereof which is part of the wall of base 12.

A main thermostat 65 controls the percolation cut-off temperature and an auxiliary thermostat 66 is preferably also provided to control the drinking temperature. While the mounting of the auxiliary thermostat 66 is in no sense as critical as that of the main thermostat 65, it is desirable for convenience and economy to mount it on the same support as the main thermostat. More specifically the thermostats 65 and 66 are desirably mounted on plate 54, one on each side thereof, with thermostat 65 being positioned in chamber 58 and thermostat 66 being positioned in chamber 59. As these thermostats 65 and 66 may be substantially identical, only the construction of one preferred embodiment of thermostat 65 need be described; corresponding parts of thermostat 66 having the same reference numerals primed.

Thermostate 65 may comprise a bimetallic arm 67 carrying at its free end an insulating stud 68 extending at right angles thereto and desirably of ceramic material. Associated with bimetal arm 67 are a pair of resilient spring arms 69 and 71 of electrically conductive material, having contacts 72 and 73 on opposed faces thereof respectively, said spring arms 69 and 71 being stressed toward each other so that contacts 72 and 73 are normally in engagement.

Desirably one of said spring arms, illustratively arm 69, is of greater length than the other and protrudes therebeyond as at 74, such protruding end 74 being in the path of movement of stud 68.

Associated with the spring arms 69 and 71 is a support arm 75 of rigid material, on which an insulating stud 76 is adjustably mounted, with the end 77 thereof extending through an opening in spring arm 69 and normally abutting against the face of spring arm 71.

The thermostats 65 and 66, each of which incorporates spacer washers 81 physically to separate its component elements and suitable insulating washers 80 electrically to insulate such elements, are mounted upon a threaded stud 79 which extends through an opening in plate 54 with one of said thermostats on each side of the plate. By means of nuts 82 and 83 threaded on opposed ends of stud 79 respectively, the thermostats are securely clamped together and retained on plate 54.

Desirably as shown in Figs. 1 and 3, a heat insulating washer 85 is provided on stud 79 to insulate thermostat 65 from the heat which might otherwise be conducted thereto from plate 54. Also heat insulating washers 85 and 86 are desirably provided on stud 79 to insulate thermostat 65 and thermostat 66 respectively from said stud, the end 87 of which, as shown in Fig. 1, is so near the lower end 26 of the heating element that it may readily be affected thereby. Accordingly thermostat 65 is heated only from the walls of chamber 58 and this by radiation and convection.

Stud 76' of thermostat 66 is desirably affixed to the end of a screw 88 threaded in a suitable opening in arm 75' and slotted as at 89 to permit adjustment by means of a screw driver. Stud 76 of thermostat 65 is desirably affixed in the end of a rod 91 which has a fine pitch thread at one end for precise adjustment and is screwed into a nut 92 affixed to arm 75 and coaxial with an opening therein. The free end of rod 91 extends through an opening 93 (Fig. 1) in the side wall of the base 11 and has a knob 94 affixed to the protruding outer end thereof to facilitate rotary adjustment. Rod 91 desirably has a collar 95 affixed thereon by a set screw 96. Coil spring 98 encompassing rod 91 and compressed between the nut 92 and the collar 95 holds rod 91 and the stud 76 controlled thereby in any position of adjustment.

In order to set the minimum and maximum range of thermostat 65 for mild and strong coffee respectively, nut 92 has an outstanding finger 99 desirably formed integrally therewith which serves to limit the movement of stop 101 formed integrally with collar 95.

To connect the thermostats in circuit, the spring arms 69 and 71 have contact lugs 103 and 104 respectively. Spring arm 71 of thermostat 65 is connected by lead 105 affixed to lug 104 which extends through an opening 106 in plate 54, to terminal plug 46, and spring arm 69 is connected by lead 107, affixed to lug 103, which extends through opening 108 in plate 54 to lug 103' of arm 69' of thermostat 66 and thence by lead 109 to the protruding end 34 of bolt 32 to which it is secured by nut 111.

Resistor 112 is associated with thermostat 65 and positioned in chamber 58 in close heat transfer relation to thermostat 65 and also in close heat transfer relation to the undersurface of the floor 19 of the receptacle to heat the contents thereof in the manner hereinafter described. Resistor 112 is desirably tapped between the ends thereof as at 113 to form two sections 112a and 112b, the former illustratively of 300 ohms and the latter of 400 ohms.

Although resistor 112 could be mounted in any suitable manner it is preferably mounted on a substantially L-shaped supporting bar 114 of electrically conducting material, the horizontal leg 117 of which extends parallel to plate 54 through a bore in said resistor. The end of the vertical leg 115 of bar 114 is affixed to lug 103 by screw 116 and the end of the horizontal leg 117 of bar 114 is connected by lead 118 to terminal 119 at one end of resistor 112. The intermediate terminal 113 of the resistor is connected by lead 121 which extends through opening 122 in plate 54 to lug 104' of arm 71' of thermostat 66, and the other terminal 120 of resistor 112 is connected by lead 123 to lug 104 of thermostat 65 to complete the circuit.

Thus as shown in Fig. 5, thermostat 65 is shunted across resistor 112, and is in series with the main heating element 27 with thermostat 66 shunted across section 112b of resistor 112.

In the operation of the percolator, coffee is put into the basket and the liquid container filled with water and closed by a suitable cover in familiar manner. Knob 94 may then be turned to set thermostat 65 for mild, medium or strong coffee as desired.

In one particular model of percolator shown by way of illustration as having a capacity of eight conventional cups and incorporating a cold water pump, the coffee diffusion to be mild would attain a temperature of approximately 135 degrees F. which occurs after about 10 minutes of percolation and to be strong would attain a temperature of approximately 195 degrees F. which occurs after about 20 minutes of percolation, any intermediate strength of coffee requiring a temperature and period of percolation between the limits stated.

With a source of current applied to terminal posts 41 and 46, heating element 27 will be energized, the circuit being from terminal 41, lead 38, through heating element 27, bolt 32, lead 109 to lug 103' of thermostat 66, lead 107 to lug 103 of thermostat 65, through arm 69 and normally engaging contacts 72, 73, arm 71, lug 104 and lead 105 to terminal 46. An alternative circuit is also provided from lug 103' of thermostat 66, arm 69', contacts 72', 73', arm 71', lug 104', through lead 121 to intermediate terminal 113 of heating element 112, thence through section 112a of said resistor 112, terminal 120 and lead 123 to arm 104 to which lead 105 is connected. As thermostat 65 effects a short circuit across resistor 112 substantially only heating element 27 which is of low ohmic value, illustratively approximately 27 ohms, will limit the flow of current through the circuit, and heating element 27, at a line voltage of illustratively 110 volts, will produce approximately 448 watts for heat. Thus in a relatively short time the water which entered well 49 through opening 51, will boil and as steam is generated it will lift the water up into tube 52 to discharge in conventional manner into the basket to start the percolation action.

However, as the water in the receptacle 10 is initially at the temperature of tap water, usually approximately 60 degrees F., it will take some time for the entire body of water therein to reach the desired temperature. Consequently although the percolation is going on, the top 19 of the base 11, which serves as the floor of the receptacle 10, as well as the plate 54 affixed thereto will heat slowly having substantially the same temperature as the contents of the receptacle.

In the heating operation, while the lower end of the main heating element 27 including the ceramic mount thereof and the exposed metal connections may become hot, this heat has no material effect on the temperature of the air within the control chamber 58, because the partion 54 serves as a barrier substantially to preclude transfer of heat to such chamber by radiation or convection from such heating element 27, and especially so, as there is a direct heat conductive path from the base of heating element 27 to the floor 19 of the receptacle and the liquid therein which forms a more ready and preferential path for heat flow from the heating element.

Moreover, there is no effective conductive path for heat from the base of the heating element to the main thermostat 65, because its mounting stud 79 is effectively heat insulated from the heating element by the various heat insulating washers 84, 85 and 86.

By reason of the relatively large metal radiating surface of the control chamber 58 directly heated from the liquid in the receptacle, the air and thermostat within the control chamber will follow closely in temperature that of said liquid, especially as the loss of heat from said control chamber is minimized by the heat insulating liner 60 on the exposed surface thereof. In the particular model of percolator here described, a temperature differential of approximately 10 degrees F. may readily be maintained between the liquid in the receptacle and the thermostat throughout the operative range between mild coffee and strong coffee percolation cut-off temperature.

Thus by originally setting the main thermostat 65 to open at a temperature lower than that of the temperature of coffee of the desired strength by such substantially fixed differential maintained between the temperature of the liquid in the receptacle and the air in the control chamber, the thermostat will accurately control the temperature of percolation cut-off to the desired value.

Reliability of the percolator under normal operating conditions is thus substantially assured and the percolation will be cut off at substantially exactly the temperature corresponding to the strength of coffee desired.

Even under adverse conditions of operation encountered in use of the device, no material variation will occur in the temperature or strength of the coffee produced. Thus, for instance, in using the percolator in very cold and drafty environment, although there may be somewhat more heat radiation from the control chamber, despite its heat insulating liner 60, the relatively large radiating surface of the control chamber exposed to the heat of the liquid in the receptacle will speedily conduct such heat to maintain the air in the chamber at substantially the temperature differential desired with respect to the liquid without material variation and hence the opening of the main thermostat is not retarded, so that the coffee will not be stronger than desired. And on the other hand when the percolator is used in a very hot environment the heat insulating liner 60 will minimize the transfer of heat into the control chamber 58, so that the temperature differential with respect to the liquid will be maintained substantially constant, and hence the main thermostat will not open prematurely so that the coffee will not be weaker than desired.

If the thermostat 65 is set, for example, to make mild coffee, when the temperature in chamber 58 reaches approximately 125 degrees F., thermostat 65 which had been set to operate at this temperature, would open. With thermostat 65 thus open, the circuit would be as shown in Fig. 6A, and the short circuit about resistor 112 would thus be removed. However, as the auxiliary thermostat 66 still remains closed as it is pre-set to operate when the contents of the receptacle are at the optimum drinking temperature at which the temperature in chamber 59 would be approximately between 145 degrees and 150 degrees F., only section 112a of resistor 112 would be in circuit. Section 112a being in series with resistance wire 27, the current in the heating circuit is materially reduced as is the heat produced thereby. For example, with section 112a, illustratively of 300 ohms, in series with resistor wire 27, illustratively of 27 ohms, the heat produced by resistance wire 27 would only be 2.94 watts and the heat produced by section 112a would be 32.67 watts.

Although 2.94 watts would be insufficient to cause percolation, 32.67 watts applied near thermostat 65 will both retain the latter in open position and will gradually heat up the contents of the receptacle until a temperature of approximately 150 degrees F. is attained therein. When that temperature is reached, chamber 59 will be sufficiently heated to cause thermostat 66 to open.

With thermostat 66 thus open, the circuit will be as shown in Fig. 6B. With both sections 112a and 112b of resistor 112 now in series with resistance wire 27, the current in the series circuit will be materially reduced and only .62 watt will be produced by resistance wire 27 and 15.96 watts will be produced by the entire length of resistor 112. Although 15.96 watts is sufficient to keep thermostat 65 open, it is not sufficient to maintain the temperature of the contents of the receptacle at 150 degrees F. and hence such temperature, as well as the temperature of chamber 59 will start to drop until the temperature of the coffee drops to 145 degrees F. At this time thermostat 66 will re-close and resume the position shown in Fig. 6A and the heat produced by resistor 112 will again increase.

Thus in operation, mild coffee is brewed by stopping percolation when the receptacle contents are at a temperature, illustratively 135 degrees F., which is below a desirable drinking temperature, but continuing heating the coffee without percolation until the desired drinking temperature, illustratively approximately 150 degrees is attained.

When strong coffee is desired, thermostat 65 is set to open when the coffee diffusion has reached illustratively the temperature of 195 degrees F. Thermostat 66 will open at 150 degrees F., that is, before percolation has stopped. At that time the circuit connections are as shown in Fig. 7A. As thermostat 65 is still closed and shunts resistor 112, the opening of thermostat 66 will have no effect.

When the temperature of the diffusion has reached 195 degrees F., thermostat 65 will open to cut resistor 112 into circuit, the circuit being shown in Fig. 7B. As only 15.96 watts is being produced by resistor 112 at this time, which although sufficient to keep thermostat 65 open is not sufficient to maintain the temperature of the coffee diffusion, such latter temperature will fall until it reaches the desired drinking temperature of approximately 145 degrees F. at which time thermostat 66 will close as shown in Fig. 7C to short circuit section 112b so that the heat produced by section 112a will increase to 32.67 watts again to raise the temperature of the diffusion.

For medium coffee percolated to a temperature of, say, 150 degrees F., and taking approximately 15 minutes of percolation, the knob 94 will be set to intermediate position and the operation and automatic control will be readily understood from the above description.

Once the main thermostat 65 has been actuated, by reason of the close proximity thereto of the hot resistor 112, it will remain open regardless of changes in the ambient temperature; and as long as thermostat 65 is thus kept open, the current flowing through the circuit will be so reduced that the heat produced by the main heating element 27 will not be sufficient to cause resumption of percolation, so that once coffee of the desired strength has been brewed, the possibility of re-percolation, which would make the coffee too strong, is precluded.

By means of the auxiliary thermostat 66, a drinker of mild coffee which generally is percolated to a temperature too low to be palatable, obtains such mild coffee at the desired drinking temperature. Yet this auxiliary thermostat does not detract from the desired operation with strong coffee that is generally percolated to a temperature too hot for the ordinary consumer and serves to bring such coffee down to and maintain it at desired drinking temperature.

As the device is automatic in operation there is no need for the user to time the same or keep watch thereover. All that is required is to plug in the unit and turn the adjustment knob 94 for the desired strength of coffee.

When the circuit is opened, resistor 112 cools and thermostats 65 and 66 reclose so that the unit is automatically re-set to the condition shown in Fig. 5 preparatory for the next use.

It is distinctly to be understood that the numerical values of ohmic resistances and resultant wattages, the periods of time, the temperatures and temperature differentials and in fact all other numerical values hereinabove stated are illustrative merely and would be predetermined for each model of percolator made according to the present invention and the component parts thereof.

The performance of a percolator of the present invention will depart from the figures illustratively herein stated by modification in the gauge and type of metal used for the body or base, by change in shape or size or volume or capacity, or by substitution of a heater of different rating, but all percolators of any one model as fabricated and assembled in mass production, will perform substantially uniformly in the manner desired, substantially regardless of the tolerances in the heater and in the positioning of the control unit and the like, and this without the need for adjustment or regulation.

The thermostats incidentally function as safety devices to prevent destruction of the heating element 27, the resistor 112 and the percolator itself, in the event the circuit is closed with insufficient or no liquid in the receptacle. In that event the temperature of the receptacle would quickly rise to over 195 degrees F. (assuming it is set to operate at this temperature) and thermostat 65 will open, greatly reducing the current by placing resistor 112 in series with the main heating element 27 and thermostat 66 will thereupon function to keep the receptacle at the safe temperature of below 150 degrees F.

As many changes could be made in the above construction and method, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. In an electric percolator of the type comprising a receptacle having a floor, a base for said receptacle having a cavity therein, an electric circuit including a heating element for said receptacle; the combination therewith of a substantially upright partition of heat conductive material extending across said cavity and affixed to the floor of said receptacle so as to conduct heat from the contents thereof, said partition defining a control chamber within said cavity exteriorly of said heating element, said partition serving substantially to bar transfer of heat by radiation, by conduction and by convection, from said heating element to said control chamber, said control chamber having a wall exposed to the exterior of the percolator, heat insulation means associated with said wall to impede the transfer of heat with respect to said control chamber, a heat responsive switch in said control chamber connected to control the operation of said heating element, a heat insulating mount for said switch, a resistor in said control chamber in close heat transfer relation to the floor of said receptacle and to said switch and normally shunted by the latter whereby upon opening of said switch, said resistor will be energized, the radiated heat therefrom retaining the switch in open condition and also being applied to the floor of the receptacle, and a second heat responsive switch in said cavity externally of said control chamber, normally shunted across a portion of said resistor.

2. In an electric percolator of the type comprising a receptacle having a floor, a base for said receptacle having a cavity therein, and an electric circuit including a heating element for said receptacle; the combination therewith of a substantially upright partition of heat conductive material extending across said cavity and affixed to the floor of said receptacle and depending therefrom so as to conduct heat from the receptacle contents, said partition defining a control chamber within said cavity exteriorly of said heating element, said partition serving substantially to bar transfer of heat by radiation, by conduction and by convection from said heating element to said control chamber, a heat responsive switch in said control chamber, a resistor in said control chamber in series with said heating element and in close heat transfer relation to the floor of said receptacle and to said switch and normally shunted by the latter, a second heat responsive switch in said cavity exteriorly of said control chamber and normally shunted across a portion of said resistor, means extending through said partition and mounting said switch on each side thereof respectively, and means heat insulating said first named switch from said mount and from said heating element.

3. A temperature control circuit to control the operation of an electric percolator of the type having a heating element, said control circuit comprising a resistor in series with said heating element, a normally closed thermostat shunted across said resistor and responsive to the temperature of the receptacle contents, means for adjusting at will the setting of said thermostat whereby said thermostat will open at a selected temperature to remove the shunt across said resistor and reduce the current through said heating element to stop percolation, a normally closed thermostat shunted across a portion of said resistor and responsive to a predetermined desired drinking temperature of the receptacle contents whereby upon opening of said first named thermostat the heat evolved by said resistor will increase the temperature of the receptacle contents to the drinking temperature range, and upon opening of both of said thermostats the temperature of the receptacle contents will decrease to the drinking temperature range, said second named thermostat being set intermittently to open and close to maintain the temperature of the receptacle contents within a desired drinking temperature range.

EMIL KOLISCH.

REFERENCES CITED

The following references are of record in the file of this patent:

UNITED STATES PATENTS

| Number | Name | Date |
|--------|------|------|
| 1,113,955 | Carey | Oct. 20, 1914 |
| 1,806,004 | Tavender | May 19, 1931 |
| 1,920,013 | Green | July 23, 1933 |
| 1,947,426 | Smith | Feb. 13, 1934 |
| 1,971,154 | Green | Aug. 21, 1934 |
| 1,984,129 | Green | Dec. 11, 1934 |
| 1,990,351 | Shroyer | Feb. 5, 1935 |
| 2,076,096 | Samuels | Apr. 6, 1937 |
| 2,168,158 | Hall | Aug. 1, 1939 |
| 2,179,936 | Keene | Nov. 14, 1939 |
| 2,194,820 | Connell et al. | Mar. 26, 1940 |
| 2,212,100 | Keaton | Aug. 20, 1940 |
| 2,217,474 | Foster | Oct. 8, 1940 |
| 2,281,319 | Newell | Apr. 28, 1942 |
| 2,422,974 | Newell | June 24, 1947 |
| 2,445,591 | Sullivan | July 20, 1948 |
| 2,504,728 | Purpura | Apr. 18, 1950 |
| 2,522,718 | Huck | Sept. 19, 1950 |
| 2,526,566 | Kolisch | Oct. 17, 1950 |